United States Patent [19]

Friederichs et al.

[11] Patent Number: 5,251,966
[45] Date of Patent: Oct. 12, 1993

[54] TRACTOR AND TRAILER BRAKING CONTROL SYSTEM TO PREVENT TRAILER OVERRUN

[75] Inventors: Otto Friederichs, Garbsen; Johann Rothen, Sarstedt; Hartmut Rosendahl, Hanover, all of Fed. Rep. of Germany

[73] Assignee: WABCO Westinghouse Fahrzeugbremsen GmbH, Hanover, Fed. Rep. of Germany

[21] Appl. No.: 609,364

[22] Filed: Nov. 5, 1990

[30] Foreign Application Priority Data

Nov. 4, 1989 [DE] Fed. Rep. of Germany ....... 3936726

[51] Int. Cl.$^5$ .......................... B60T 8/00; B60T 13/66
[52] U.S. Cl. .......................................... 303/7; 303/15; 303/20; 188/3 R
[58] Field of Search ............... 188/112 R, 112 A, 3 R; 303/7, 15, 20; 280/432, 446.1

[56] References Cited

U.S. PATENT DOCUMENTS

| 4,060,284 | 11/1977 | Steiner | 188/112 R X |
| 4,568,129 | 2/1986 | Stumpe | 303/7 |
| 4,616,881 | 10/1986 | Müller et al. | 303/7 |
| 4,631,514 | 12/1986 | Fujiwara | 188/112 R X |
| 4,671,578 | 6/1987 | Rothen et al. | 303/15 |
| 4,697,853 | 10/1987 | Scholz | 303/7 |
| 4,712,839 | 12/1987 | Brearley et al. | 303/20 X |
| 4,721,344 | 1/1988 | Frait et al. | 303/7 X |
| 4,804,237 | 2/1989 | Lee et al. | 303/7 |
| 5,002,343 | 3/1991 | Brearley et al. | 303/7 |

FOREIGN PATENT DOCUMENTS

| 0224832 | 6/1987 | European Pat. Off. | 303/20 |
| 3502051 | 7/1986 | Fed. Rep. of Germany . | |
| 3923599 | 2/1990 | Fed. Rep. of Germany | 303/20 |
| 3901269 | 7/1990 | Fed. Rep. of Germany | 303/7 |
| 0315361 | 12/1988 | Japan | 303/20 |
| 2196074 | 4/1988 | United Kingdom | 303/7 |

*Primary Examiner*—Robert J. Oberleitner
*Assistant Examiner*—Josie A. Ballard
*Attorney, Agent, or Firm*—Horst M. Kasper

[57] ABSTRACT

A method for the braking of a vehicle train with pressure-actuated brakes and arrangements for performing this method are disclosed. The prior art shows that, because of a different rapid build-up of a braking pressure in the various rigid vehicles of a vehicle train, there occurs an overrun shock during adjustment transition shifting braking phases. According to one embodiment of the invention, there is furnished a lead and predominance by a predetermined value in the co-braking signal furnished from the one rigid vehicle to the second rigid vehicle of a vehicle train. According to a further embodiment, a predominance by a predetermined amount in the braking pressure in the second vehicle versus the co-braking signal is furnished, if during the preceding brake application actuation the overrun shock has surpassed a preset tolerance width. The invention can be applied in particular for vehicle trains made up of a motor vehicle and one or several trailers or semitrailers.

34 Claims, 3 Drawing Sheets

TRACTOR AND TRAILER BRAKING CONTROL SYSTEM TO PREVENT TRAILER OVERRUN

BACKGROUND OF THE INVENTION

1. Field of the Invention

The invention relates to a method for the braking of a vehicle train furnished with pressure-actuated brakes. During brake application actuation there is generated a brake-force-request signal in a rigid vehicle of the vehicle train. A co-braking signal is furnished at least for co-control of the braking pressure in a second rigid vehicle of the vehicle train.

2. Brief Description of the Background of the Invention Including Prior Art

Such a method is applied according to FIG. 1 of the German Patent document DE 3,502,051-A1. According to this reference, a pilot signal, induced and triggered by a driver into a brake-value transducer, which is actually here the brake valve 4, is transformed in the one rigid vehicle into braking pressures of in each case one brake circuit. One of these braking pressures serves simultaneously for determination and setting of the braking pressure in the other rigid vehicle. The braking pressure in the one rigid vehicle is not used directly for the setting of the braking pressure in the other rigid vehicle, based on safety reasons. Rather, the braking pressure is transformed into a co-braking signal, present as a control pressure, and is furnished as such a control pressure to a trailer brake valve, which carries the reference numeral 9 in the reference. Whether the determination of the braking pressure in the other rigid vehicle by the co-braking signal presents an exclusive control or a co-control, depends on whether additional braking-pressure control devices are furnished to the other rigid vehicle. According to the braking system of the reference, there is present a co-control, because an automatic load-sensing braking-pressure controller is present in the other rigid vehicle, where the automatic load-sensing braking-pressure controller is symbolized by a load sensor having the reference numeral 17.

Adjustment transition shifting phases of the brake application actuation, in the following, for purposes of simplicity, designated as "non-stationary brake phases," occur at the beginning of a braking from a free running or during a brake application actuation upon an increasing requirement of brake force. In such a non-stationary brake phase, there occurs a delayed build-up of braking pressure in the known braking system in the second rigid vehicle, due to the described signal transformation and signal transfer path between the rigid vehicles, represented by a pressure line. This delayed build-up of braking pressure, in connection with the response delay of the braking aggregates in the second rigid vehicle, results in an overrun shock, i.e. a force onto the first rigid vehicle in approximate motion direction of he second rigid vehicle.

SUMMARY OF THE INVENTION

1. Purposes of the Invention

It is an object of the present invention to provide a method which improves with simple means the problems associated with the overrun shock of one rigid vehicle relative to another rigid vehicle of a vehicle train.

It is another object of the present invention to provide a braking system for vehicle trains which results in a substantially uniform braking of the individual braking effort of the rigid vehicles of the vehicle train.

It is yet another object of the present invention to provide a braking system for a vehicle train which limits or substantially avoids the generation of overrun shocks.

These and other objects and advantages of the present invention will become evident from the description which follows.

2. Brief Description of the Invention

According to the invention, there is provided a decrease of the overrun shock and this is in particular advantageous for a braking system, where the automatic control value in the stationary uniform braking phases is the force exchanged between the rigid vehicles. The designation "drawbar-force-controlled" has become common for such braking systems, even though they are not only used in drawbar trains but also in semitrailer trains. The above-recited overrun shock or represents an important interference situation in such a braking system.

The present invention is useful for braking systems which are actuated by pressure means of any desired kind.

Preferably, the one of the rigid vehicles is a tractor or motor vehicle and the second rigid vehicle is a drawbar trailer or a semitrailer. In a vehicle train, comprising more than two rigid vehicles, the first, second, third, etc. trailer and the in each case following trailer can represent the one or the second rigid vehicle within the nomenclature of this application.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

The use of full-drawn lines in the above drawings is associated with pressure-means lines and the use of dash-dotted lines in the above drawings is associated with electrical connections. The components performing the same functions have been designated with the same reference numerals.

DESCRIPTION OF INVENTION AND PREFERRED EMBODIMENT

Figure 1:
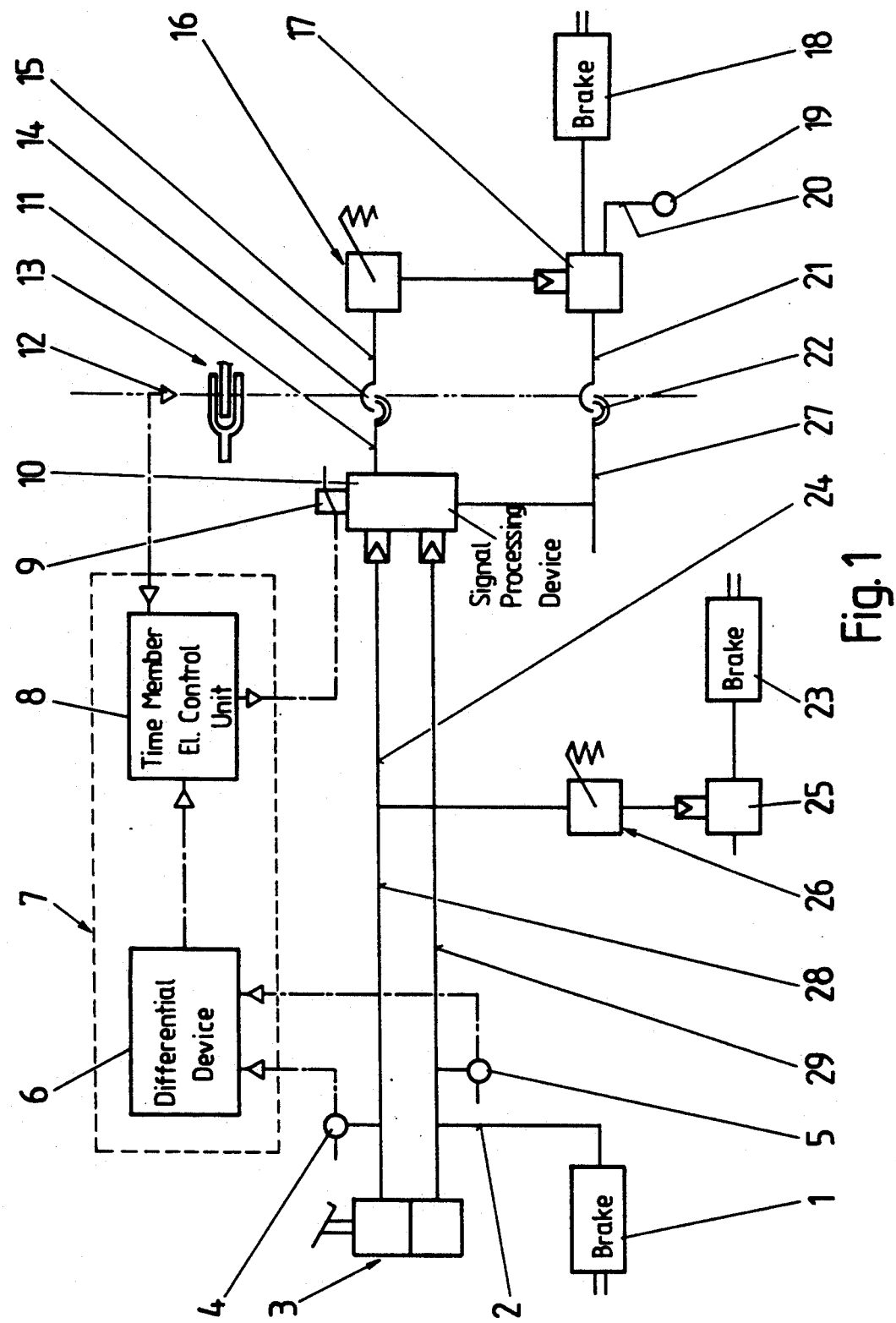
FIG. 1 is a view of a schematic circuit diagram illustrating the operation of the invention.

FIG. 1 illustrates schematically the service braking system of a vehicle train with a motor vehicle and/or tractor as the first rigid vehicle and a drawbar trailer or a semitrailer, which in the following will be designated and referred to as "trailer," as the second rigid vehicle. The vehicle train or, respectively, the rigid vehicles can or, respectively, have to comprise in addition further braking devices, for example a parking braking device, and/or an auxiliary braking device.

The motor vehicle and the trailer are coupled, with respect to the forces present between them, by way of a coupler 13. Depending on the trailer kind, the coupler 13 can be formed as a drawbar coupler or as a semi-trailer coupler.

The recited service braking system is a conventional dual-circuit/dual-line system with additional equipment.

In FIG. 1, as seen by the viewer on the left of a thick dashed separating line, without showing the pressure-means generating facility and supply unit of the motor vehicle braking system, a dual-circuit brake value transducer 3 transforms a pilot signal, initiated by the driver, which can be an actuation force and/or an actuation path, into brake-force request signals in the shape of pressures at the outlets of its two circuits. One of the two pressures is furnished and fed directly as a braking pressure via a pressure line 2 to one or several brakes 1 of the first one of the two brake circuits. The second one of the two pressures controls via a pressure line 28 the application of braking pressure to one or several brakes 23 of the second braking circuit through the intermediary of a relay valve 25 and of an automatic load-sensing braking-pressure controller, in the following designated as automatic load-sensing valve 26. The automatic load-sensing valve 26 is shown upstream of the control inlet of the relay valve 25, but it can also be disposed downstream of the relay valve 25, i.e. between the output of the relay valve 25 and the brakes 23. The relay valve 25 and the automatic load-sensing valve 26 can be combined into a single structural device unit.

The motor-vehicle braking system comprises a signal-processing device, formed as a trailer control valve 10 with a pressure-control inlet for each brake circuit, for co-actuation of the trailer braking system, illustrated to the right of the dashed separation line in FIG. 1. The pressures controlled at and transmitted by the outlets of the brake-value transducer 3 are also applied to the pressure-control inlets of the trailer control valve 10 via pressure lines 24 and 29.

The trailer-control valve 10 is constructed in a conventional fashion such that, under normal operating conditions, it is controlled by one of the pressures in the pressure lines 24 and 29 and, in case of a defect in a brake circuit of the motor-vehicle braking system, by the higher pressure or by the one pressure still remaining of these pressures. In each case,. the relevant pressure is designated and employed in the following as brake-force-request signal. In the previously described context, the trailer-control valve is formed such that it furnishes at its outlet a trailer-control pressure, depending on the relevant pressure and thus on the brake-force-request signal. The trailer-control pressure is led via a trailer-control line 11, disposed on the motor-vehicle side, to a control-pressure coupler 14 and represents a co-braking signal.

The trailer-control valve 10 exhibits in addition an electric control inlet 9, which belongs to the additional equipment further described below.

Furthermore, a trailer supply line 27, disposed on the motor vehicle side, is part of the motor-vehicle braking system. Said trailer supply line 27 connects a supply coupler 22 to the pressure-means generating facility and supply unit and, on the supply side, connects also the trailer-control valve 10 to the trailer supply line 27.

The trailer-braking system is supplied with pressure fluid means via a supply line 20, 21, shown in FIG. 1, connecting on the trailer side the supply coupler 22 to a trailer supply 19. The supply line 20, 21 is led via a trailer brake valve 17, which represents a modified relay valve. The control inlet of the modified relay valve is connected via a trailer-side trailer control line 15 to the control pressure coupler 14. A trailer-side automatic load-sensing valve 16 is disposed in the trailer control line 15. The automatic load-sensing valve 16 can also be connected downstream of the trailer brake valve 17 or, application conditions permitting, it can be dispensed with completely. The trailer brake valve 17 and the automatic load-sensing valve 16 can also be combined to a single structural device unit.

Upon application of pressure at a control inlet, the trailer brake valve 17 connects one or several brakes 18 of the trailer with the trailer supply 19 until a corresponding braking pressure has been reached in the brakes 18. This braking pressure is in a relation to the trailer control pressure as the co-braking signal, where the relation is determined by the construction and dimensioning of the trailer brake valve 17 and, if present, by the respective load-sensing setting of the automatic load-sensing valve 16.

In non-stationary braking phases, i.e. at the beginning of a braking from a free running or if, during brake application actuation, the driver increases the requirement for brake force by increasing the pilot signal fed to the brake-value transducer 3, there occurs with the service braking system in the previously described scope an overrun shock in the coupler 13, i.e. a force from the trailer onto the motor vehicle approximately in motion direction of the trailer. The overrun shock has its cause in the response delay of the trailer control valve 10, of the automatic load-sensing valve 16, of the trailer brake valve 17, as well as in the respective pressure lines in connection with the response delay of the brakes 18.

The overrun shock is decreased with the additional equipment described in more detail in the following.

The time period, required for the build-up of the relevant and effective pressure in the pressure lines 24 or, respectively, 29, i.e. of the brake-force-request signal, is designated as the non-stationary brake phase. A build-up is assumed in this context as long as this pressure increases at least with a preset minimum rise speed.

In order to capture this time period and thus the non-stationary brake phase, the additional equipment comprises a switch-on or electronic actuation unit 4, 5, 6. This electronic actuation unit 4, 5, 6 comprises pressure sensors 4 and 5, which transform the pressure in each case in one of the pressure lines 24 or, respectively, 29, into an electrical pressure signal, as well as a differential device 6, selecting the relevant pressure signal and differentiating this signal versus time. As long as the differential device 6 determines a higher rise speed than the predetermined minimum rise speed or an equal rise speed for the relevant pressure, and thus for the brake-force request signal, the differential device 6 provides an actuation signal.

The additional equipment comprises also a force measurement device 12. In the present instance, it is important that this force measurement device 12 transforms the overrun shock according to size and direction into an electrical force signal. The range effectiveness of the force measurement device can be expanded for other purposes.

Furthermore, an electronic control unit 8, receiving the force signal of the force measurement device 12 and the actuation signal of the electronic actuation unit 4, 5, 6, belongs to the additional equipment in addition to the electrical control inlet 9 of the trailer control valve 10. A tolerance width for the force signal is stored in the electronic control unit 8. The electronic control unit 8 is constructed such that it compares, during an applied actuation signal, the force signal with the stored tolerance width and, if the force signal surpasses the tolerance width, it delivers a control signal for the electrical control inlet 9 of the trailer control valve 10 during the following brake application actuation. The electronic control unit 8 dimensions and furnishes the control signal such that it controls the trailer control valve 10 for altering the trailer control pressure, i.e. the co-braking signal, by a predetermined value versus to the trailer control pressure in the non-stationary brake phases of the preceding brake application actuation.

The additional equipment thus effects an adaptive decrease of the overrun shock. If the electronic control unit 8 determines in case of a brake application actuation that the overrun shock, represented by the force signal, surpasses the predetermined tolerance width, then, during the non-stationary brake phases of the following brake application actuation, the electronic control unit 8 sets, by way of the control signal and by way of the electrical control inlet 9 of the trailer control valve 10, a preset predominance in the trailer control pressure versus the trailer control pressure during the non-stationary brake phases of the preceding brake actuation, i.e. the electronic control unit 8 alters the co-braking signal by a predetermined value. If during this following brake application actuation the overrun shock still surpasses the tolerance width, then the electronic control unit 8 increases the control signal by its original value for the then following brake application actuation, so that then the predominance is again increased by its original value and thus the co-braking signal is increased again by the predetermined value. If the overrun shock still surpasses the tolerance width during further brake applications, then this method is continued until the overrun shock does no longer surpass the tolerance width during a brake application. The predominance in the trailer control pressure as an alteration of the co-braking signal is thus increased in constant steps until the overrun shock is of the predetermined limiting value as just acceptable overrun shock at a limit of the tolerance width, or until the overrun shock is within the preset tolerance width.

The overrun shock decreased as described above, can be altered for example by a load change of the trailer. The overrun shock can again surpass the predetermined tolerance width, in which case the additional equipment enters into operation as described above. The overrun shock can also assume negative values, i.e. turn into an overrun pull. For this purpose, the above-recited property of the force signal is important, namely that the force signal also indicates the direction of the overrun shock. During the occurrence of an overrun pull during the following brake application actuation or, respectively, the following brake application actuations, the electronic control unit 8 takes back in each case by one step the control signal and thus the lead and predominance of the trailer control pressure and thus the alteration of the co-braking signal versus the in each case preceding brake application until the overrun shock lies on the limit of the tolerance width or within the same.

In fact, the electronic control unit 8 can dimension the control signal also in a direction of a following and a post-dominance in the trailer control pressure and thus in a direction of negative alteration of the co-braking signal until the overrun shock amounts to a limit of the tolerance width or is within the tolerance width.

The embodiment illustrated can be further enhanced in that, during a quick brake application actuation, recognizable in that the relevant pressure and thus the brake-force-request signal increase faster than with a predetermined maximum rise speed, the decrease of the overrun shock or, respectively, overrun pull does not take place. This can be realized for example by forming the electronic actuation unit 4, 5, 6 such that the strength of the actuation signal is dependent on the rise speed of the relevant pressure or, i.e. of the brake-force-request signal, and that the electronic control unit 8 of FIG. 1 is formed such that it compares the actuation signal with a stored maximum value of the actuation signal and does not deliver the control signal in case of equality as well as in case of a stronger actuation signal.

The embodiment can be further enhanced without or with the preceding enhancement such that the step of the actuation signal and thus the lead and predominance of the trailer control pressure and thus the predetermined value, by which the co-braking signal is altered, depend on the size of the deviation of the overrun shock from the predetermined tolerance width of the overrun shock determined during the preceding brake application actuation. This can be realized by a structuring of the electronic control unit 8 such that the electronic control unit 8 adapts the strength of the control signal to the size of the deviation of the force signal from its predetermined tolerance width determined during the preceding brake application actuation.

The exemplified embodiment with or without one or all of the preceding enhancements can be further enhanced such that the step of the control signal and thus of the lead and predominance and thus the predetermined value, by which the co-braking signal is altered, are dependent on the speed of the brake application actuation recognizable from the rise slope speed of the relevant pressure or, respectively, of the brake-force-request signal. This can be realized in that the electronic actuation unit 4, 5, 6 is structured such that the strength of the actuation signal depends on the rise speed of the relevant pressure and thus of the brake-force-request signal, and that the electronic control unit 8 is constructed such that the strength of the control signal depends on the strength of the actuation signal. In this case, the already enhanced electronic actuation unit 4, 5, 6 can be used in addition, as recited above.

In the case that it is difficult to capture the end of the non-stationary brake phase in the form of the minimum rise speed of the relevant pressure and thus the brake-force-request signal, then the exemplified embodiment can be further developed without and with one or several other enhancements such that the lead and predominance in the trailer control pressure and thus the alteration of the co-braking signal are maintained for a predetermined time after the non-stationary braking phase. This can be realized by a time member in the electronic control unit 8. After decay drop of the actuation signal, the electronic control unit 8 maintains the control signal for the predetermined time with the aid of the time member.

The dashed enclosure line, designated with reference numeral 7, indicates that the electronic actuation unit 4, 5, 6 and the electronic control unit 8 can be partially or fully united with respect to construction and/or with respect to function.

In particular, a combination and unification of the differential device 6 and of the electronic control unit 8 are to be considered.

The force measurement device 12 is illustrated in the region of the coupler 13. It can be disposed in this region of the coupler in the motor vehicle or in the trailer. Alternatively, the force measurement device 12 can also be disposed at other suitable locations of the motor vehicle or of the trailer, for example, at a traverse of the frame.

The electronic control unit 8 and the differential device 6 can be distributed on the motor vehicle and the trailer or, as a device component unit possibly formed therefrom, in the motor vehicle or in the trailer. In case the complete additional equipment is disposed in the motor vehicle, there is created a solution which allows the realization of the invention in connection with a conventional trailer. On the other hand, if the force measurement device 12, the electronic control unit 8, and the differential device 6 are disposed in the trailer, then a conventional motor vehicle can be retrofitted in a simple way by mounting one or two pressure sensors 4 or, respectively, 5, and the electrical control inlet 9 in the trailer control valve, or a trailer control valve with electrical control inlet for realizing the invention.

In case of an application of pressure at only one control inlet, the trailer control valve 10 reacts the same as to the recited relevant pressure. The disposition according to FIG. 1 therefore holds also for a disposition with a single-circuit pressure-controlled trailer control valve and for a disposition with a single-circuit motor vehicle brake system.

Figure 2:
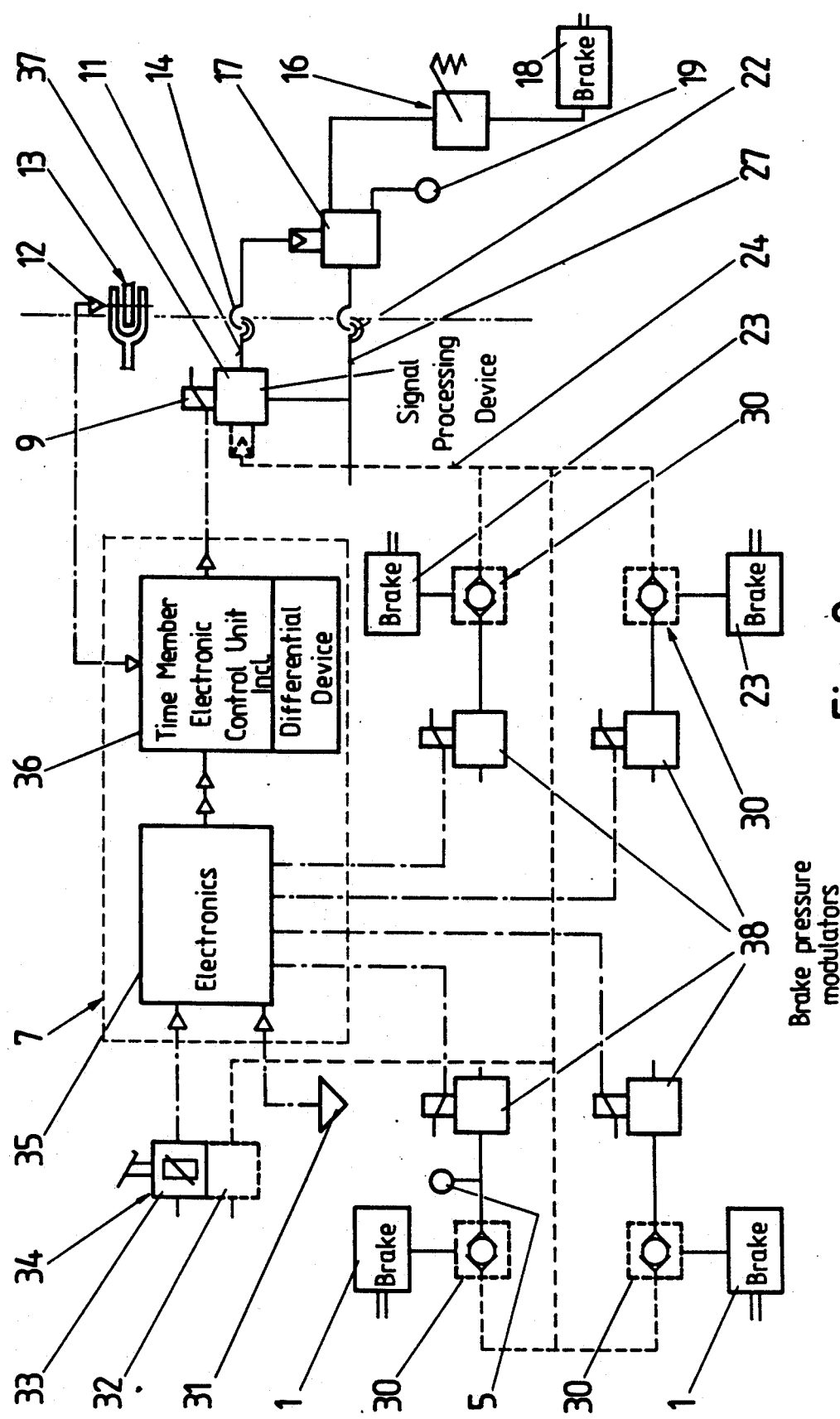
FIG. 2 is a view of a schematic circuit diagram of a second arrangement illustrating the operation of the invention.

The trailer brake system, according to the embodiment of FIG. 2, is only changed versus that of FIG. 1 by the disposition of the automatic load-sensing valve 16. Instead of being disposed upstream of the control inlet of the trailer brake valve 17, the modification of which can generally represent a relay emergency valve, the automatic load-sensing valve 16 is disposed downstream of the trailer brake valve 17 between the outlet of the trailer brake valve 17 and the brakes 18. In general, this change does not result in any invention-essential effects on the functioning of the arrangement.

The motor vehicle brake system is in this case electrically controlled. The brake value transducer 3 of FIG. 1 is substituted by an electrical brake value control device 33, 35, 38. The electrical brake value control device 33, 35, 38 comprises an electrical brake value transducer 33, an electronics 35, in each case one electrical braking-pressure modulator 38 for each brake 1 and, respectively, 23, and brake-value sensors, not illustrated. Each parameter occurring during a brake application actuation can be considered for use as a brake value. In particular, the deceleration of the motor vehicle, the brake force, and the braking pressure have to be considered in this context.

The trailer control valve, designated here with 37 and serving as a signal-processing device, is according to a basic embodiment completely electrically controlled and exhibits again the electrical control inlet 9. The electrical control inlet 9 is connected, as described in more detail below, to the electrical automatic brake-value control device 33, 35, 38.

In case of an initiation of the pilot signal by the driver, the brake value transducer 33 furnishes a brake-value-request signal, dependent on the pilot signal which is fed to the electronics 35 and which is transformed by the electronics 35 into the brake-pressure signals to the brake-pressure modulators 38, under consideration of the actual brake-value signals captured by the brake value sensors as well as, possibly, under consideration of further signals. A load sensor 31 is indicated as an example for the furnisher of a further signal. Thus, an automatic load-sensing apparatus is integrated into the electrical brake value control device 33, 35, 38. Wheel rotation speed signals for obtaining an antilock protection effect and/or for automatically controlling an initial wheel spin can be considered as examples for further signals.

The braking-pressure modulators 38 transmit the braking pressure, based on the braking pressure signals, to the respective coordinated brake 1 or, respectively, 23.

One of these braking pressures serves in this case as the brake-force-request signal. Again, a pressure sensor 5 serves for its capturing and for its transformation into the pressure signal. One or several further pressure sensors can be coordinated to other brakes 1 or, respectively, 23, wherein the average value of these pressure signals can be formed as a braking-pressure request signal. This possibility is offered in particular where the braking pressures serve as a braking value, in which case the pressure sensors coordinated to the individual brakes 1 or, respectively, 23 are simultaneously braking value sensors. The pressure sensor 5 or, respectively, the further pressure sensors can be integrated into, in each case, the coordinated braking-pressure modulator 38.

The electronics 35 furnishes a signal, depending on the brake-value-request signal, to the electronic control unit, designated here with 36, simultaneously with the braking pressure signals to the braking-pressure modulators 38. The electronic control unit 36 transforms the signal into a control signal, dependent on said signal, for the control input 9 of the trailer control valve 37. The trailer control valve 37 delivers as co-braking signal a trailer control pressure corresponding to the control signal.

The function of the differential device 6 of FIG. 1 is integrated in this case into the electronic control unit 36 which, for this purpose, is fed with the pressure signal of the pressure sensor 5 and, possibly, with the pressure signals of the further pressure sensors or, respectively, with their average values. The electronic control unit 36 thus serves, in connection with the pressure sensor 5 and, possibly, the additional pressure sensors, as the electronic actuation unit 4, 5, 6 of FIG. 1.

Therefore, the electronic control unit 36 is structured such that it decreases or increases, respectively, the strength of the control signal, corresponding to the detailed explanations relative to the arrangement of FIG. 1, by the predetermined value depending on the force signal.

The trailer control valve 37 serving in this case as signal processing device can be formed as an electric pressure modulator of the kind as designated with 38 according to the up to now described basic embodiment.

The motor vehicle braking system of this arrangement can be further enhanced by an emergency control device, as is indicated with dashed lines.

For this purpose, the brake value transducer 33 is supplemented by a pressure port (32) to a combined electro-pressure-brake-value transducer 34. The pressure part 32 corresponds to a circuit of the brake value transducer 3 of FIG. 1. A 2-way valve 30 is disposed upstream of each brake 1 or, respectively, 23. The braking pressure, controlled by the respective pressure modulators 38, is fed via one flow path of the 2-way valve 30 to the brake, and the pressure, controlled at the outlet port of the pressure part 32, is fed via the second flow path of the 2-way valve 30 to the brake as well as via a pressure conduit system, not designated in detail. The trailer control valve 37 is furnished, according to this enhanced embodiment with a pressure control inlet, not designated in detail. The pressure control inlet is in turn connected via a pressure line, designated again with reference numeral 24, to the recited pressure conduit system and thus to the output of the pressure part 32. Under normal conditions, i.e. during properly operating electrical brake value control device 33, 35, 38, the preponderance and precedence of the electric brake value control device 33, 35, 38 versus the emergency control device is assured by devices and arrangements, not illustrated, by example of the brake value transducer 34. This means that under normal operating conditions, the brakes 1 and 23 are controlled with the braking pressure controlled by the respective braking pressure modulator 38 and the trailer control valve 37 is controlled by the control signal of the electronic control unit 36.

No steps for decreasing of the overrun shock are undertaken in case the emergency control device is employed. However, it is clear that the emergency control device can be enhanced insofar by a corresponding application of the disclosures, solutions and ways illustrated above.

Figure 3:
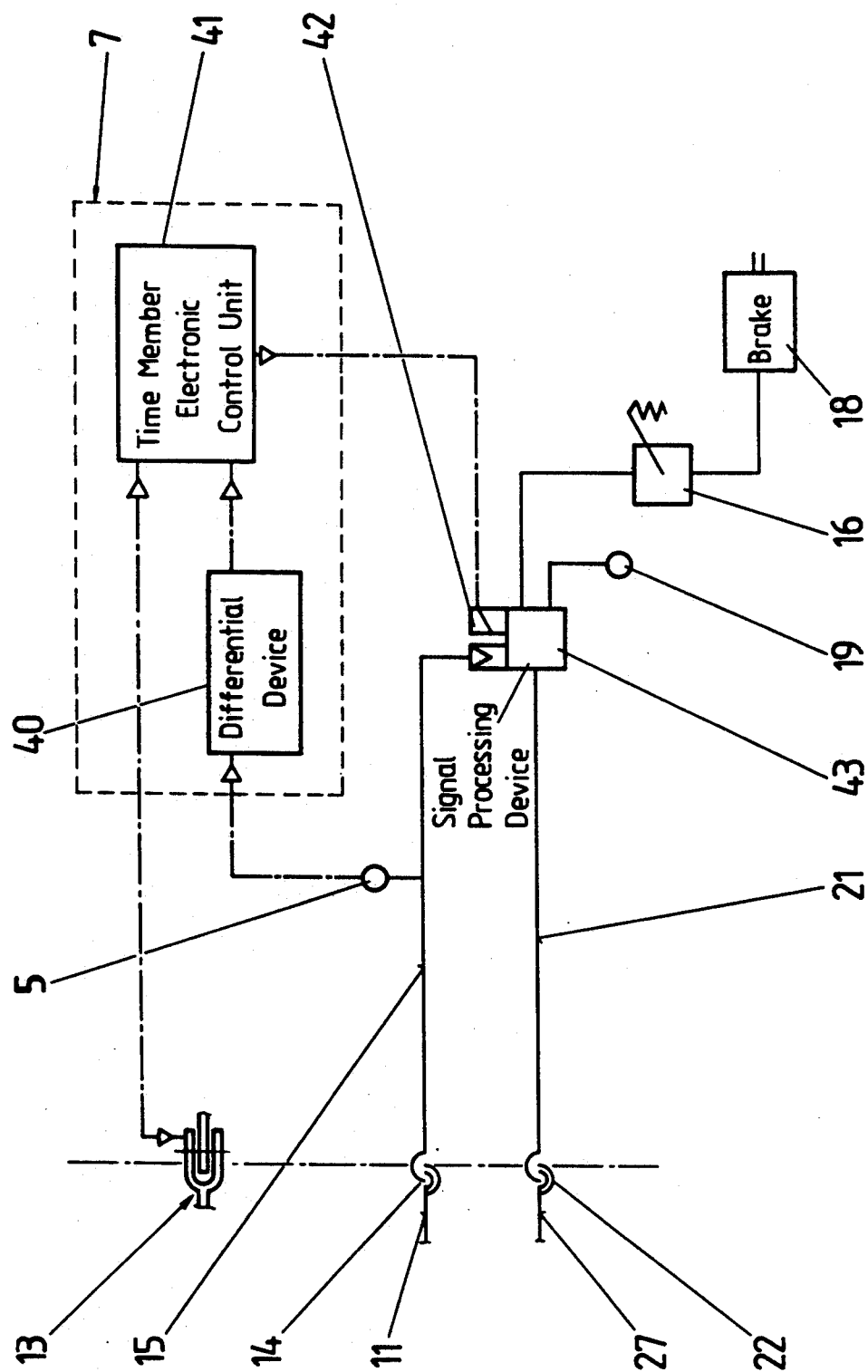
FIG. 3 is a view of a schematic circuit diagram of a further embodiment illustrating the operation of the invention.

The additional equipment is completely disposed in the trailer according to FIG. 3. This arrangement is associated with the advantage of the realization of the invention without requiring any steps at the motor vehicle itself. This means that a trailer so equipped can be coupled to each motor vehicle with a dual-line trailer brake connection and the invention can nevertheless be realized.

In this case, the trailer brake valve, designated with reference numeral 43, serves as a signal processing device. The trailer brake valve exhibits in addition to its control inlet for the co-braking signal, formed by the trailer control pressure at the trailer control coupler 14 and in the trailer-side trailer control line 15, also an electrical control inlet 42.

The electronic actuation unit 5, 40 comprises in this case a pressure sensor, designated again with reference numeral 5, and a differential device 40. The pressure sensor 5 transforms in this case the trailer control pressure at the trailer control coupler 14 or in the trailer control line 15 into the pressure signal. The differential device 40 operates like the differential device 6 of the arrangement according to FIG. 1, such that in this case the non-stationary braking phase is captured by way of the rise speed of the trailer control pressure, i.e. of the co-braking signal.

The electronic control unit of the embodiment of FIG. 3 designated in this case with reference numeral 41 operates like the electronic control unit 8 of the arrangement according to FIG. 1. However, as distinguished from FIG. 1, the electronic control unit 41 effects by way of the control signal and of the electrical control inlet 42 of the trailer brake valve 43 a certain lead and predominance or respectively a certain following and post-dominance of the braking pressure in the trailer or, more precisely, in the brake 18 of the trailer relative to the braking pressure determined by the trailer control pressure representing the co-braking signal and by the automatic load-sensing valve 16 as well as, possibly, by leading and predominance or by following and post-dominance of the brake pressure during preceding brake application actuations. As a result, this arrangement operates like the preceding embodiments, however, this embodiment employs the brake pressure in the trailer instead of the co-braking signal and thus employs the relation between the braking pressure in the trailer or, more precisely, in the brakes 18 of the trailer and the trailer control pressure and thus the co-braking signal.

The possibilities of enhanced embodiments recited in the preceding arrangements hold also for the present arrangement under consideration of the difference of the employment of the braking pressure in the trailer instead of the co-braking signal.

Under employment of the relevant pressure or, respectively, of the braking pressure as a brake-force-request signal, the preceding embodiments furnish a particularly simple solution to be realized for the definition of a non-stationary brake phase. However, also any other suitable method for definition of the non-stationary brake phase can be employed. For example, instead of the braking pressure as brake-force-request-signal in the embodiment of FIG. 2 there could be used characteristic points in the course of the respective brake value or of its rise speed or a minimum rise speed of the brake value.

Thus, as far as nothing else is said in the preceding statements, the statements made for one arrangement are also holding and possible for the other arrangements directly or in a corresponding way.

A person of ordinary skill in the art will recognize that the applications of the invention are not limited to the preceding embodiments. A person of ordinary skill in the art will recognize in particular that in a vehicle train, comprising more than two rigid vehicles, the items set forth for the recited arrangements can be modified in a corresponding way for two drawbar trailers or semitrailers as the first and as the second rigid vehicle in a corresponding way, wherein the trailer braking valve is employed in the first rigid vehicle instead of the brake-value transducer, possibly in connection with additional devices.

It will be understood that each of the elements described above, or two or more together, may also find a useful application in other types of braking systems differing from the types described above.

While the invention has been illustrated and described as embodied in the context of a method for braking of a truck and trailer equipped with pressure-actuated brakes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method for the braking of a vehicle train consisting of at least two rigid vehicles furnished with pressure-actuated brakes and force-transmittingly coupled by a coupler, said method comprising the steps of
    (a) in a preliminary step defining a tolerance width for a force signal;
    (b) generating a brake-force-request signal in a first one of said rigid vehicles thereby initiating a brake application and a generation of a co-braking signal in said first vehicle;
    (c) furnishing said co-braking signal to a second one of said rigid vehicles for at least a co-control of a braking pressure in said second rigid vehicle;
    (d) detecting non-stationary braking phases of said brake application;
    (e) generating in said non-stationary braking phases a force signal representative of a force occurring in said coupler;
    (f) comparing said force signal with said tolerance width;
    (g) in a repetition of steps (b), (c) and (d) altering said co-braking signal by a predetermined value in non-stationary braking phases if said force signal generated in step (e) has exceeded said tolerance width; and
    (h) whilst repeating step (d) repeating steps (e) and (f).

2. The method according to claim 1, wherein the non-stationary braking phase of the brake application is defined by a time period during which the brake-force request signal increases at least with a preset minimum rise speed.

3. The method according to claim 1 further comprising
    presetting a maximum rise speed such that the alteration of the co-braking signal by the predetermined value is not performed in case the brake-force request signal increases faster than at the preset maximum rise speed.

4. The method according to claim 1, wherein the predetermined value, by which the co-braking signal is altered, depends on the value by which said force signal has exceeded said tolerance width.

5. The method according to claim 1, wherein the predetermined value by which the co-braking signal is altered depends on a rise speed of the brake-force request signal.

6. The method according to claim 1, wherein the alteration of the co-braking signal by the predetermined value is maintained for a predetermined time after the non-stationary braking phase of the brake application.

7. The method according to claim 1, comprising
    a force measurement device for generating said force signal; a signal processing device, which delivers the co-braking signal and is electrically at least co-controllable;
    an electronic control unit having stored therein said tolerance width and receiving an actuation signal, which characterizes the start of the non-stationary braking phase of the brake application, and receiving said force signal, wherein the electronic control unit delivers, in the presence of said actuation signal, a control signal for the signal-processing device, and wherein the electronic control unit is furnished such that, in the presence of said actuation signal, the electronic control unit compares the force signal with said tolerance width and, in case of an exceeding of the tolerance width in the repetition of the brake application, the electronic control unit dimensions the control signal such that the signal processing device is controlled for alteration of the co-braking signal by the predetermined value.

8. The method according to claim 7, further comprising
    an electronic actuation unit, capturing a rise speed of the brake-force-request signal, and supplying the actuation signal above a predetermined minimum rise speed.

9. The method according to claim 8, wherein the electronic actuation unit is formed such that a strength of the actuation signal is dependent on the rise speed of the brake-force signal, and wherein the electronic control unit is formed such that it compares the actuation signal with a stored maximum value and that, in case of equality as well as in case the actuation signal surpasses the maximum value, it does not furnish a control signal.

10. The method according to claim 8, wherein the electronic actuation unit is furnished such that a strength of the actuation signal is dependent on the rise speed of the brake-force signal, and wherein the electronic control unit is furnished such that a strength of the control signal is dependent on the strength of the actuation signal.

11. The method according to claim 8, wherein the brake-force request signal is formed by a pressure in said first rigid vehicle, and wherein the electronic actuation is formed by at least one pressure sensor transforming said pressure in said first rigid vehicle into an electrical pressure signal and by a differential device which differentiates this pressure signal versus time.

12. The method according to claim 8, wherein the electronic actuation unit and the electronic control unit are at least in part structurally and/or functionally combined.

13. The method according to claim 8, wherein the electronic control unit and/or the electronic actuation unit and/or the force measurement device and the signal processing device are disposed in the first rigid vehicle.

14. The method according to claim 7, wherein the electronic control unit is furnished such that it adapts a strength of the control signal to the value by which the force signal has exceeded the tolerance width.

15. The method according to claim 7, further comprising
    a time member which is disposed in the electronic control unit by means of which the electronic control unit maintains the control signal, after decay of the actuation signal, for a predetermined time.

16. The method according to claim 7, wherein the force measurement device is disposed at the coupler.

17. A method for the braking of a vehicle train consisting of at least two rigid vehicles furnished with pressure-actuated brakes and force-transmittingly coupled by a coupler, said method comprising the steps of
    (a) in a preliminary step defining a tolerance width for a force signal;
    (b) generating a brake-force-request signal in a first one of said rigid vehicles thereby initiating a brake application and a generation of a co-braking signal in said first vehicle;

(c) furnishing said co-braking signal to a second one of said rigid vehicles for at least a co-control of a braking pressure in said second rigid vehicle;

(d) detecting non-stationary braking phases of said brake application;

(e) generating in said non-stationary braking phases a force signal representative of a force occurring in said coupler;

(f) comparing said force signal with said tolerance width;

(g) in said non-stationary braking phases determining a relation between said co-braking signal and said braking pressure in said second rigid vehicle;

(h) in a repetition of steps (b), (c) and (d) altering said relation determined in step (g) by a predetermined value by altering said braking pressure in said second rigid vehicle if said force signal generated in step (e) has exceeded said tolerance width; and (i) whilst repeating step (d) repeating steps (e), (f) and (g).

18. The method according to claim 17, wherein the non-stationary braking phase of the brake application is defined by a time period duration during which the co-braking signal increases at least with a predetermined minimum rise speed.

19. The method according to claim 17, wherein the alteration of the relation between the co-braking signal and the braking pressure in the second rigid vehicle by the predetermined value is not performed if the co-braking signal increases faster than with a predetermined maximum rise speed.

20. The method according to claim 17, wherein the predetermined value, by which the relation between the co-braking signal and the braking pressure in the second rigid vehicle is altered, depends on the value by which said force signal has exceeded said tolerance width.

21. The method according to claim 17, wherein the predetermined value, by which the relation between the co-braking signal and the braking pressure in the second rigid vehicle is altered, depends on a rise speed of the co-braking signal.

22. The method according to claim 17, wherein the alteration of the relation between the co-braking signal and the braking pressure in the second rigid vehicle by the predetermined value is maintained for a predetermined time after the non-stationary braking phase of the brake application.

23. The method according to claim 17, wherein the first rigid vehicle is a motor vehicle and wherein the second rigid vehicle is a trailer pulled by the motor vehicle.

24. The method according to claim 17, comprising
a force-measurement device for generating said force signal;
a signal-processing device which is controllable by the co-braking signal and electrically at least co-controllable; and electronic control unit having stored therein said tolerance width and receiving san actuation signal which characterizes the start of the non-stationary braking phase of the brake application, and receiving the force signal, wherein the electronic control unit, in the presence of the actuation signal, furnishes a control signal for the signal processing device, and wherein the electronic control unit is formed such that it compares, in the presence of the actuation signal, the force signal with said tolerance width and, in case of an exceeding of the tolerance width in the repetition of the brake application, the electronic control unit dimensions the control signal such that the signal processing device is controlled for altering the braking pressure in the second rigid vehicle by the predetermined value as compared to the braking pressure, determined by the co-braking signal in the second rigid vehicle.

25. The method according to claim 24, further comprising
an electronic actuation unit capturing a rise speed of the co-braking signal and delivering the actuation signal above a preset minimum rise speed.

26. The method according to claim 25, wherein the electronic actuation unit is formed such that a strength of the actuation signal is dependent on the rise speed of the co-braking signal, and wherein the electronic control unit is formed such that it compares the actuation signal with a stored maximum value and that, in case of equality as well as in case the actuation signal surpasses the maximum value, the electronic control unit does not deliver a control signal.

27. The method according to claim 25, wherein the electronic actuation unit is formed such that a strength of the actuation signal is dependent on the rise speed of the co-braking signal; and wherein the electronic control unit is formed such that a strength of the control signal is dependent on the strength of the actuation signal.

28. The method according to claim 25, wherein the co-braking signal is a trailer control pressure, and wherein
the electronic actuation unit is formed by a pressure sensor, transforming the trailer control pressure into an electrical pressure signal, and by a differential device, differentiating this pressure signal versus time.

29. The method according to claim 25, wherein the electronic actuation unit and the electronic control unit are at least in part structurally and/or functionally combined.

30. The method according to claim 25, wherein the electronic control unit and/or the electronic actuation unit and/or the force measurement device and the signal processing device are disposed in the first rigid vehicle.

31. The method according to claim 25, wherein the electronic control unit, the electronic actuation unit, the force measurement device and the signal processing device are disposed in the second rigid vehicle.

32. The method according to claim 24, wherein the electronic control unit is formed such that it adapts a strength of the control signal to the value by which the force signal has exceeded the tolerance width.

33. The method according to claim 24, further comprising a time member which is disposed in the electronic control unit by means of which the electronic control unit maintains the control signal, after decay of the actuation signal, for a predetermined time.

34. The method according to claim 24, wherein
the force measurement device is disposed at the coupler.

* * * * *